United States Patent
Nuttall et al.

(10) Patent No.: US 7,118,820 B2
(45) Date of Patent: Oct. 10, 2006

(54) METHOD AND APPARATUS FOR HUMIDIFICATION CONTROL OF AN ENERGY RECOVERY DEVICE IN A FUEL CELL POWER PLANT

(75) Inventors: Benjamin Charles Nuttall, Bloomfield, CT (US); Bryan F. Dufner, West Hartford, CT (US); Albert P. Grasso, Vernon, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 277 days.

(21) Appl. No.: 10/723,502

(22) Filed: Nov. 26, 2003

(65) Prior Publication Data

US 2005/0112430 A1 May 26, 2005

(51) Int. Cl.
*H01M 8/04* (2006.01)
(52) U.S. Cl. .............. 429/26; 429/34; 429/20; 429/24
(58) Field of Classification Search ............ 429/26, 429/24, 22, 34, 38, 13, 17, 19, 20
See application file for complete search history.

(56) References Cited

U.S. PATENT DOCUMENTS

| | | | |
|---|---|---|---|
| 6,007,931 A | 12/1999 | Fuller et al. .............. 429/13 |
| 6,048,383 A | 4/2000 | Breault et al. ............ 95/44 |
| 6,110,613 A | 8/2000 | Fuller ...................... 429/17 |
| 6,274,259 B1 | 8/2001 | Grasso et al. ............ 429/13 |
| 6,465,118 B1 * | 10/2002 | Dickman et al. ......... 429/20 |
| 6,562,498 B1 | 5/2003 | Walsh ...................... 429/17 |
| 6,617,065 B1 * | 9/2003 | Balasubramanian et al. .. 429/13 |
| 6,979,505 B1 * | 12/2005 | Grasso et al. ............ 429/17 |
| 2002/0009625 A1 * | 1/2002 | Saito et al. ............... 429/26 |
| 2003/0116654 A1 * | 6/2003 | Herd et al. ............... 239/551 |

\* cited by examiner

*Primary Examiner*—Raymond Alejandro
(74) *Attorney, Agent, or Firm*—Stephen A. Schneeberger

(57) ABSTRACT

An arrangement is provided in a fuel cell power plant (10) for dispensing (58 74, 60, 64) a liquid medium, such as water (66), into a process oxidant (air) stream (53) that flows through one gas channel (42) in an energy recovery device (ERD) (32). An exhaust gas stream (48) containing heat and moisture from the fuel cell (12) flows through another channel (44) in the ERD. An enthalpy exchange barrier (46) separates the one and the other gas channels, but allows mass and/or heat transfer therebetween. The water is injected into the air stream (53) in a controlled (70, 74) amount, and perhaps temperature (78), in response to sensed parameters (80, 84, 90) of the power plant, including the process air stream, to adjust one or more conditions in the power plant. Controlling ERD dryness, providing a defrost capability for the ERD, and/or preventing excessive water accumulation in the system are several of the conditions controlled.

16 Claims, 2 Drawing Sheets

METHOD AND APPARATUS FOR HUMIDIFICATION CONTROL OF AN ENERGY RECOVERY DEVICE IN A FUEL CELL POWER PLANT

TECHNICAL FIELD

This invention relates to fuel cell power plants, and particularly to the use of an energy recovery device in a fuel cell power plant. More particularly still, the invention relates to control of the mass and/or heat transfer properties of the fuel cell power plant's energy recovery device to enhance water balance and plant energy efficiency.

BACKGROUND ART

Fuel cell power plants are commonly used to produce electrical energy from reducing and oxidizing fluids to power electrical apparatus. In such power plants, one or typically a plurality, of planar fuel cells are arranged in a fuel cell stack. Each cell generally includes an anode electrode and a cathode electrode separated by an electrolyte. A reducing fluid such as hydrogen is supplied to the anode electrode, and an oxidant such as oxygen or air is supplied to the cathode electrode. The reducing fluid and the oxidant are typically delivered to and removed from the cell stack via respective manifolds. In a cell using a proton exchange membrane (PEM) as the electrolyte, the hydrogen electrochemically reacts at a catalyst surface of the anode electrode to produce hydrogen ions and electrons. The electrons are conducted to an external load circuit and then returned to the cathode electrode, while the hydrogen ions transfer through the electrolyte to the cathode electrode, where they react with the oxidant and electrons to produce water and release thermal energy.

The anode and cathode electrodes of such fuel cells are separated by different types of electrolytes, depending on operating requirements and limitations of the working environment of the fuel cell. One such electrolyte is a PEM electrolyte, which consists of a solid polymer well-known in the art. Other common electrolytes used in fuel cells include phosphoric acid or potassium hydroxide held within a porous, non-conductive matrix between the anode and cathode electrodes. It has been found that PEM cells have substantial advantages over cells with liquid acid or alkaline electrolytes in satisfying specific operating parameters because the membrane of the PEM provides a barrier between the reducing fluid and oxidant that is more tolerant to pressure differentials, is fixed and cannot be leached from the cell, and has a relatively stable capacity for water retention.

In operation of PEM fuel cells, it is critical that a proper water balance be maintained between a rate at which water is produced at the cathode electrode including water resulting from proton drag through the PEM electrolyte and rates at which water is removed from the cathode and at which water is supplied to the anode electrode. An operational limit on performance of a fuel cell is defined by an ability of the cell to maintain the water balance as electrical current drawn from the cell into an external circuit varies and as an operating environment of the cell varies. For PEM cells, if insufficient water is returned to the anode electrode, adjacent portions of the PEM electrolyte dry out, thereby decreasing the rate at which hydrogen ions may be transferred through the PEM and also resulting in cross-over of the reducing fluid leading to local over heating. Similarly, if insufficient water is removed from the cathode, the cathode electrode may become flooded, thereby effectively limiting oxidant supply to the cathode and hence decreasing current flow. Additionally, if too much water is removed from the cathode, the PEM may dry out, limiting ability of hydrogen ions to pass through the PEM, thus decreasing cell performance.

As fuel cells have been integrated into power plants for powering vehicles, maintaining a water balance within the power plant has become a greater challenge because of a variety of factors. To minimize weight and space requirements on a vehicle, the plant must be self-sufficient in water to be viable. That means that enough water must be retained within the plant to offset water losses from gaseous streams of reactant fluids passing through the plant. For example, any water exiting the plant through a cathode exhaust stream of gaseous oxidant or through an anode exhaust stream of gaseous reducing fluid must be balanced by water produced electrochemically at the cathode and retained within the plant. Otherwise, one incurs the cost and size/weight penalty of various water recovery components if it is necessary to make water.

An additional requirement for maintaining water self-sufficiency in fuel cell power plants is associated with components necessary to convert hydrocarbon fuel to a stream of hydrogen-rich reducing fluid for the anode. Those components may include a reformer that relies on steam to convert the hydrocarbon to the desired reducing fluid. The fuel processing components or system water and energy requirements are part of an overall water balance and energy requirement of the fuel cell power plant. Water made into steam in a boiler must be replaced by water recovered from the plant such as by condensing heat exchangers in the cathode exhaust stream and associated piping.

A common approach to enhancing water recovery and retention is use of condensing heat exchangers in exhaust streams of the power plant wherein the exhaust streams are cooled to a temperature at or below their dew points to precipitate liquid water, which is then returned to the power plant. Typically, such a condensing heat exchanger is used to cool a cathode exhaust stream, which upon leaving a cathode chamber includes evaporated product water. The condensing heat exchanger passes the cathode exhaust stream in heat exchange relationship with a stream of cooling ambient air, and then directs condensed water indirectly through piping back to water storage.

While condensing heat exchangers have enhanced the water recovery and energy efficiency of fuel cell power plants, the heat exchangers encounter decreasing water recovery efficiency as ambient temperature increases. Where the power plant is to power a vehicle, such as an automobile, the plant will be exposed to an extremely wide range of ambient temperatures. For example, where an ambient air coolant stream passes through a heat exchanger, performance of the exchanger will vary as a direct function (inversely) of the temperature of the ambient air because decreasing amounts of liquid precipitate out of power plant exhaust streams as the ambient air temperature increases.

An additional requirement of using such condensing heat exchangers in fuel cell power plants powering vehicles is related to operation of the vehicles in temperatures below the freezing temperature of water. Because water from such exchangers is often re-introduced into the PEM fuel cells of the plant, the water may not be mixed with conventional antifreeze to lower its freezing temperature because such antifreeze would be absorbed by the catalysts in the cells and thereby decrease cell efficiency.

To overcome some of the aforementioned limitations which exist if the power plant were to use a condensing heat exchanger, a recent development instead uses an energy recovery device (ERD) that employs a fine pore enthalpy exchange barrier for effective transfer of energy and/or water from one gas stream to another over a broader range of ambient air temperatures and conditions. An example of such an ERD having a fine pore enthalpy exchange barrier between the inlet oxidant gas flow path and the fuel cell exhaust gas flow path is shown and described in U.S. Pat. No. 6,274,259 that issued on Aug. 14, 2001 to Grasso, et al, and is assigned to the assignee of the present invention, and which patent is hereby incorporated herein by reference. The fine pore enthalpy exchange barrier may be viewed as comprising one or more plates that include a support matrix of porous material such as fiber and/or particulate material, with porous graphite layers perhaps being preferred. The support matrix defines pores, which pores are then filled with a liquid transfer medium such as an aqueous solution or the like, to create a gas barrier. The pores of the support matrix have a size range of about 0.1–100 microns and the matrix is hydrophilic so as to be wetted by the liquid transfer medium and result in a bubble pressure typically greater than 0.2 p.s.i. An inlet surface of the fine pore enthalpy exchange barrier is positioned in contact with a process oxidant inlet stream entering a fuel cell power plant, and an opposed exhaust surface of the barrier is positioned in contact with an exhaust stream exiting the plant so water and heat exchange from the exhaust stream directly into the process oxidant inlet stream. The liquid transfer medium, which may be a low volatility, aqueous solution having a low freezing temperature, may simply be trapped in the fine pore enthalpy exchange barrier in an adequate amount or, if necessary, may be re-supplied from a supply reservoir. This assures a gas barrier between the two gas flow streams and allows some humidification of the process oxidant inlet stream as its ambient temperature rises.

While affording significant benefit over the condensing heat exchangers of the prior art, the ERD described in the aforementioned U. S. Pat. No. 6,274,259 may be too responsive to changes in the ambient humidity and/or temperature levels of the process oxidant inlet stream. Very hot, dry, i.e., "arid" inlet air may cause the evaporation of humidifying water to occur at a higher rate than can provided by the condensing exhaust gas stream; possibly exceeding the total level of fuel cell-generated recoverable exhaust water. This situation is unacceptable because it can result in dry-out of the ERD plates, particularly along the inlet air leading edge of the plates.

Accordingly, what is needed is an improved arrangement for control of humidification in, and of, an energy recovery device in a fuel cell power plant, particularly with respect to the process oxidant inlet stream flowing therethrough.

Further desirable is an arrangement for controlling performance of an energy recovery device in a fuel cell power plant to regulate water balance in the power plant.

Still further desirable is the ability to rapidly and simply control humidity and/or temperature conditions associated with a fine pore enthalpy exchange barrier in an energy recovery device of a fuel cell power plant.

DISCLOSURE OF INVENTION

There is provided a fuel cell power plant for generating electrical energy from a process oxidant stream and a reducing fluid stream, and wherein the plant comprises one or more fuel cells for producing the electrical energy from the process oxidant stream and the reducing fluid stream, and providing a fuel cell exhaust stream containing moisture and sensible heat; an energy recovery device (ERD) having first and second gas flow channels separated by a respective enthalpy exchange barrier, the fuel cell exhaust stream is connected to pass through the first gas flow channel and a source of process oxidant for the process oxidant stream is connected to pass through the second gas flow channel, thereby to allow mass and/or heat transfer between the gases in the first and second gas flow channels via the enthalpy exchange barrier; and injection means disposed to inject a liquid medium, such as water, into the process oxidant stream preparatory to the process oxidant passing through the energy recovery device second gas flow channel for regulating the rate of transfer of mass and heat, i.e., enthalpy, between the fuel cell exhaust stream and the process oxidant stream.

The enthalpy exchange barrier of the ERD is preferably of the type having fine pores in a support structure matrix, such as porous graphite layers, fibrous materials, or the like. A liquid, such as water, normally fills the pores of the support structure matrix to provide a gas seal between the process oxidant stream and the fuel cell exhaust stream, and to further facilitate the transfer of mass, such as water, and/or sensible heat from one gas stream to the other.

A liquid such as water, with purity suitable for ingestion into the fuel cell, may be injected into the process oxidant inlet stream at, or just prior to, its passage through the ERD. By controlling the flow rate and duration, i.e., the amount, and/or the temperature of the injected water, it is possible to relatively simply regulate one or more operating conditions of the power plant, and particularly the ERD. The water may be injected by one or more spray nozzles or similar dispersion devices positioned at or near the inlet end of the process oxidant channel through the ERD, as for instance in a plenum adjacent to that inlet to the ERD.

According to one aspect, the temperature of the process oxidant being supplied to the ERD is monitored. When that oxidant temperature becomes capable of evaporating water from the enthalpy exchange barrier faster than the fuel cell exhaust air can provide condensed water, as for example at air temperatures above about 85° F., water may be injected into the process oxidant inlet stream prior to entering the ERD. This cools and humidifies the process oxidant inlet stream, which in turn reduces the drying effect of that stream on the water contained in the enthalpy exchange barrier. Relatively small quantities of water addition are needed to achieve this inlet air humidification, typically being 5% of the recoverable water rate.

According to another general aspect, water may be injected into the process oxidant inlet stream at the time of power plant start-up, particularly after an extended shut-down, to facilitate the wetting of the enthalpy exchange barrier prior to the production of adequate condensed water from the fuel cell exhaust air. A specific application of this general aspect resides in injecting relatively warm water into the process oxidant inlet stream in the event plant start-up occurs under freezing conditions and it is necessary to defrost the ERD.

In accordance with yet another aspect, performance of the ERD can be controllably degraded by the injection of warm water into the process oxidant inlet stream to raise its dew point and decrease the water transfer from the fuel cell exhaust air stream. This capability may be useful if it is desired for the fuel cell power plant to fall below a water balance condition. In such instance, there is a net system water loss via the exhaust, and that condition may be temporarily desired to prevent undesired overflow (i.e. spillage) of liquid water from the system.

The foregoing features and advantages of the present invention will become more apparent in light of the following detailed description of exemplary embodiments thereof as illustrated in the accompanying drawings.

BEST MODE FOR CARRYING OUT THE INVENTION

Figure 1:
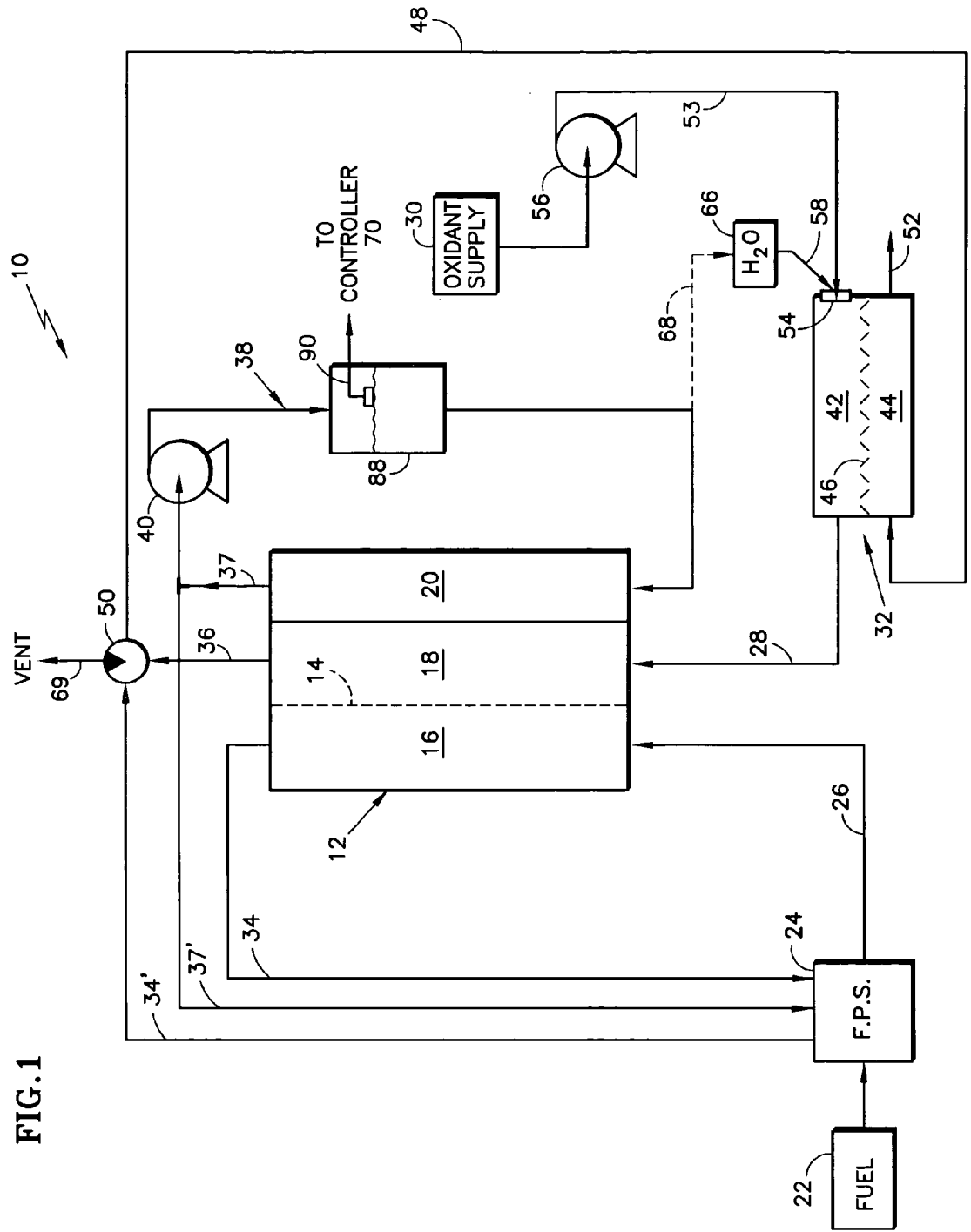
FIG. 1 is a simplified schematic representation of a fuel cell power plant utilizing injection of water into a process oxidant inlet stream to control water and/or heat transfer conditions in an energy recovery device (ERD) through which that oxidant stream subsequently flows.

Referring to the drawings in detail, a fuel cell power plant is shown schematically, very generally, in FIG. 1 and generally designated by reference numeral 10 as a working environment for the present invention. The fuel cell power plant 10 includes at least one fuel cell means for producing electrical energy from a reducing fluid and an oxidant stream, such as fuel cell 12. The fuel cell 12 has an electrolyte 14 such as a proton exchange membrane (PEM), an anode electrode region 16 and cathode electrode region 18 on opposite sides of the electrolyte 14. The fuel cell 12 is typically combined with other virtually identical fuel cells (not shown) in a well known manner to form a fuel cell stack assembly that includes manifolds for directing a reducing fluid and process oxidant stream into and out of the fuel cell 12 in a manner well known in the art. The fuel cell 12 may also include a coolant flow channel or path 20 for removing heat and some excess product water from the fuel cell.

A hydrogen-rich reducing fluid is stored in a fuel supply 22 preparatory to processing and refinement by a fuel processing system (FPS) 24 to provide a desired reducing fluid that is particularly hydrogen-rich for delivery, as via conduit or stream 26, to the anode 16 of fuel cell 12. As used herein, "conduit" and "stream" may be used interchangeably, with the former representing flow ducting and the latter representing the fluid flow itself. The FPS 24 may be any of a variety well known in the art for providing the reducing fluid, and may typically include a reformer, a steam generator, shift reactor(s), preferential oxidizer, etc. (not shown), or portions thereof.

Reducing fluid from fuel supply 22 and FPS 24 is delivered to the anode 16 via stream 26. Similarly, an oxidant inlet conduit 28 directs an oxidant stream such as air from an oxidant supply 30 into fuel cell 12 via oxidant manifolding (not shown) to the cathode electrode region 18. The oxidant stream may undergo changes in humidity and/or temperature between its source at oxidant supply 30 and its delivery to fuel cell 12 via stream 28, principally as a result of flowing the oxidant stream through an energy recovery device (ERD) 32 in accordance with the invention, as will be described hereinafter in greater detail.

The reducing fluid admitted to the anode electrode region 16 and the oxidant stream admitted to the cathode electrode region 18 of fuel cell 12 electrochemically react in the presence of catalysts and the PEM electrolyte 14, in a well known manner, to provide electrical energy and product water. Additionally, an anode exhaust stream, typically containing some unused reducing fluid, is discharged from the anode electrode region 16 and is delivered, via stream 34, to a burner/steam generator (not shown) in the FPS 24 for the production of steam. A cathode exhaust stream is discharged from the cathode electrode region 18 via stream 36, and typically includes oxidant (air) that has been heated by the reaction in the fuel cell and further, contains moisture (water) from the reaction.

The coolant flow path 20 through the fuel cell 12 serves to cool the fuel cell and to remove excess product water via coolant exhaust stream 37. That coolant flow path 20 and coolant exhaust 37 are typically part of a coolant loop 38 that may cool, clean, and recirculate at least a portion of the coolant. Only a circulation pump 40 is depicted in FIG. 1, but it will be understood that other components (not shown) are present and well known. The coolant is either water or an aqueous solution designed for low temperature operation, and thus may be a source of water for other uses. For example, coolant exhaust stream 37' is directed to the FPS 24 to provide water for use, as either liquid or vapor, in the reformation process. Water in the coolant loop 38 may be used to maintain water balance in the system in a known manner and further, may be used as a source of water in accordance with the invention. Still further, to the extent there is excess product water, provision may be made for discharging some from the power plant system; however an aspect of the invention seeks to eliminate or mitigate that need.

Directing attention to the invention in greater detail, the ERD 32 is present for the purpose of enhancing the water recovery and heat efficiency of the fuel cell power plant 10 without the requirement of a condensing heat exchanger for that purpose. However, additional demands are placed on the ERD under conditions of excess ambient heat and/or high or low humidity, either in the ambient oxidant or in the fuel cell exhausts, as may occur in mobile vehicular applications. Broadly, the ERD 32 is constructed to define a process oxidant flow stream 42 for the incoming processing oxidant and a fuel cell exhaust stream 44 for the gas stream, or streams, being exhausted from the fuel cell 12. The process oxidant flow stream 42 and the fuel cell exhaust flow stream 44 extend along opposite surfaces of an enthalpy exchange barrier 46 that serves to normally separate the two flow streams while permitting the transfer of mass (water or the like) and sensible heat therebetween. Typically, though not necessarily, the process oxidant flow stream 42 and the fuel cell exhaust flow stream 44 flow in opposite directions relative to each other relative to the enthalpy exchange barrier 46.

While in the broadest sense of the invention the enthalpy exchange barrier 46 of ERD 32 might be some form of ionomeric membrane, it is preferred in the present embodiment to use a fine pore support structure matrix. Typical examples are of the type described in the U.S. Pat. No. 6,274,259. In such instance, the enthalpy exchange barrier 46 can be a fine pore support structure matrix of porous graphite layers; porous graphite-polymer layers; inorganic-fiber thermoset polymer layers; glass fiber layers; synthetic-fiber filter papers treated to be wettable; porous metal layers; perforated metal layers with particulate material in the pores; and/or a plurality of combinations of these layers, or any other material suitable for making fine pore structures. The layers may sometimes be referred to as "plates". The materials of the layers are, or are preferably made, hydrophilic. The pore sizes are preferably in the range of 0.1 to 100 microns so as to create a gas barrier having a bubble pressure of greater than 0.2 p.s.i. when the hydrophilic pores are wetted by a liquid transfer medium. That liquid transfer medium is, in the preferred embodiment, the moisture, typically water, contained in the gas streams flowing through the ERD 32.

The warm or hot exhaust gases from the fuel cell 12 are supplied as the fuel cell exhaust stream 48 to the ERD 32, and are derived either directly by the cathode exhaust 36, or by an oxidized anode exhaust stream 34' derived from anode exhaust 34 after it has fueled a burner in the FPS 24, or by a combination of both of those fuel cell exhaust streams as symbolically represented by a multi-way valve 50 which provides the option to directly vent, as vent stream 69, part of the exhaust gas. The fuel cell exhaust gases flow through the ERD 32 via the fuel cell exhaust flow stream 44 and exit from the ERD and the power plant 10 via exhaust stream 52.

The oxidant supply 30, typically a source of air, provides oxidant for the fuel cell 12. That oxidant is conducted to the fuel cell 12 via the ERD 32, where it may gain, or lose, moisture and/or latent and sensible heat from the fuel cell exhaust gas stream 44, via the enthalpy exchange barrier. The process oxidant inlet stream is extended from supply 30, via conduit or stream 53, to an oxidant inlet 54 to the ERD 32 to become the process oxidant flow stream 42. An oxidant blower 56 is positioned in the oxidant flow path, in either stream 53 or stream 28, to effect delivery of the oxidant.

There is further provided means for injecting water into the process oxidant inlet stream 53, nominally at or just prior to inlet 54 to the ERD 32. This injection of water is symbolically represented by arrow 58 in the schematic of FIG. 1, and is depicted in greater detail with reference to FIG. 2 wherein one or more spray nozzles 60 mounted in a plenum 62 deliver a spray 64 of water 58 delivered to the nozzles from a water source, or supply, 66. The water supply 66 may be a separate reservoir independent of other sources of water in the power plant 10, but preferably is derived from a feed from the coolant loop 38, as represented by broken line 68 in FIG. 1. The water spray 64 provided by the nozzle 60 is sufficiently fine and dispersed to allow good mixing with the stream of oxidant delivered into the plenum 62 from stream 53. In this way, humidification of the process oxidant stream 42 in plenum 62 may be accomplished to supplement that which occurs via the normal transfer of moisture through the enthalpy exchange barrier 46.

Figure 2:
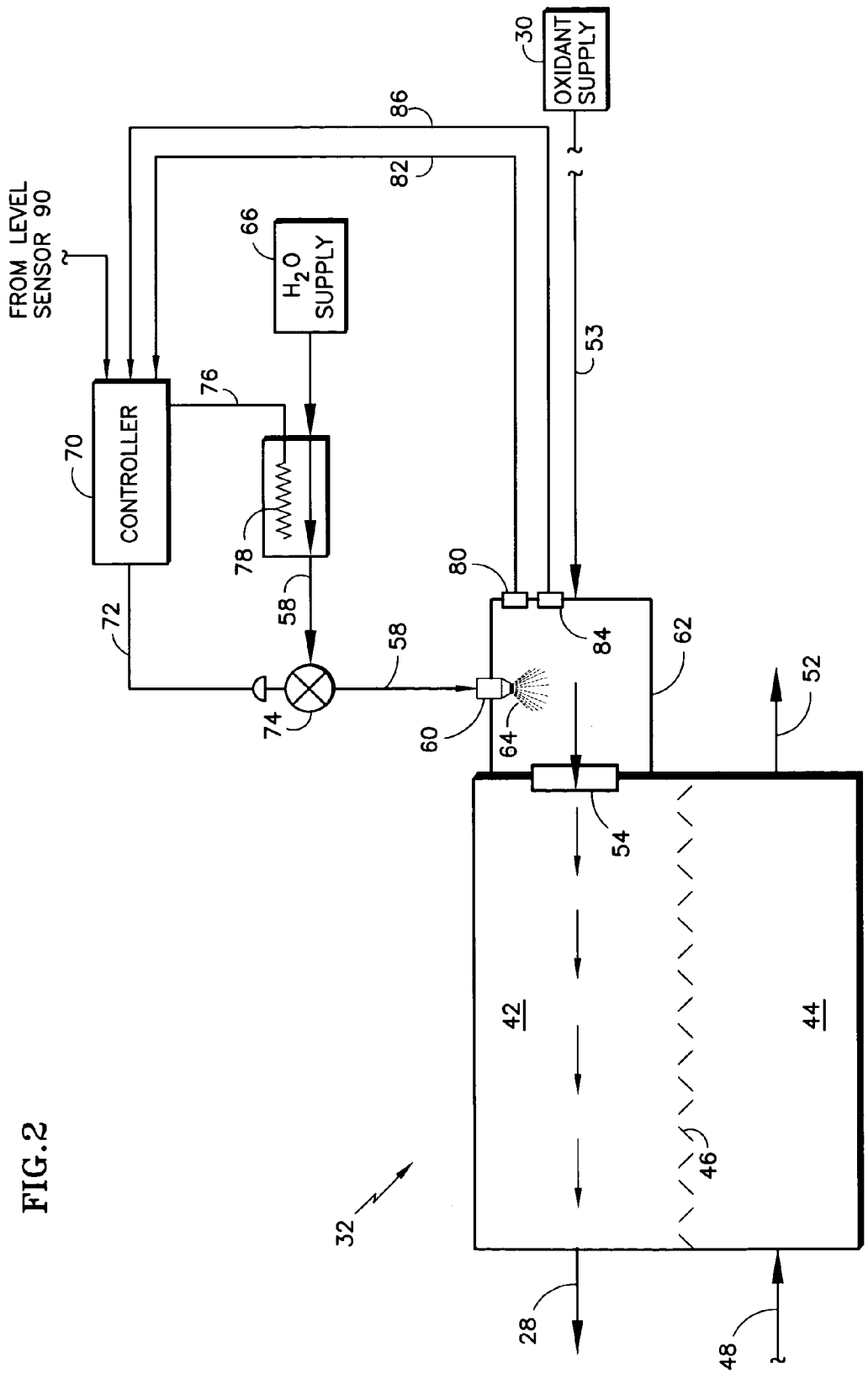
FIG. 2 is a fragmentary schematic representation of the power plant of FIG. 1, showing the water injection and its control in greater detail.

In addition to simple delivery of a water spray to the incoming process oxidant stream, further aspects provide for controlling the flow rate and amount and/or the temperature of the water injected into that oxidant stream. In that regard, a controller 70 in FIG. 2 is operative in a known manner to deliver a control signal via lead 72 to a control valve 74 connected in a portion of the water delivery line 58 from water supply 66. This enables the delivery of water to spray nozzle 60 to be regulated at least as to amount, as by controlling flow rate and/or duration. Further still, the controller 70 is depicted as providing a control signal via lead 76 to a heater, such as heating element 78, for controlling the temperature of the water delivered to the nozzle 60. A temperature sensor 80 monitors the temperature of the ambient process oxidant delivered via stream 53 and provides an indication to controller 70 via lead 82. Similarly, a humidity sensor 84 may be used to monitor the moisture content of the ambient process oxidant delivered via stream 53 and provides an indication to controller 70 via lead 86. As an alternative to humidity sensor 84, the moisture content of the incoming air may be determined by measurement of sensible temperature, as with dry bulb and wet bulb temperature measurements and comparisons.

A still further parameter is controlled, that being the water retained in the coolant loop 38. An accumulator 88 in the coolant loop 38 includes a level sensor 90 for indicating the level of water in the accumulator as a measure of the amount of water in the system. A water level signal is extended from sensor 90 to the controller 70 to further control the amount and the temperature of water delivered to spray nozzle 60 in a manner that degrades performance of the ERD 32 and thereby increases the amount of water removed from power plant 10 when the water level becomes excessive.

Some excess water injection is tolerable since the primary cooling of the inlet air occurs from water evaporation. Once saturation occurs, the inlet air temperature does not change substantially. Generally speaking, low amounts of water are injected when either a) the air is hot, i.e., greater than 85° F., in order to prevent dry out; or b) at start-up, when warmed water serves to "wet-up" and/or defrost the system. Conversely, relatively higher amounts of water are injected when the water level in accumulator 88 is nearly full, in order to reduce water recovery.

Reference is made now to the various modes of operation possible with the ERD 32 having provision for injection of water spray 64 into the process oxidant inlet stream 53 just prior to entry into the ERD. It will be understood that the flow rate and/or duration, and thus the quantity, of injected water spray may be controlled via valve 74, as determined by manual control or more preferably, suitably-programmed controller 70 and associated inputs from one or more sensors 80, 84, 90, etc. The temperature of the injected spray 64 may be controlled similarly, as through control of heater 78 in response to inputs from sensor 80, although normal coolant water temperatures may be suitable without additional heating.

Because an inlet airflow at high ambient temperatures may tend to dry out the enthalpy exchange barrier 46 and thus allow some degree of unwanted cross-flow therethrough of the fuel cell exhaust flow stream 44 into the process oxidant flow stream 42, a water spray 64 is provided into the inlet process oxidant stream 53, 42 to cool and add water vapor sufficient to prevent such dry-out of barrier 46. This is accomplished by monitoring a parameter indicative, directly or indirectly, of incipient dry-out of barrier 46. On the one hand, the humidity sensor 84 that monitors the dryness of the inlet process oxidant stream 53 may serve to provide such indication. However, in a relatively simple and effective arrangement, a temperature threshold of the ambient process oxidant may be used as the main, or sole, determinant of whether to inject spray 64, or not. It has generally been determined that ambient air temperatures above about 85°–90° F. will lead to the unwanted dry-out of enthalpy exchange barrier 46. Thus, a control threshold of about 85°–90° F., as monitored by sensor 80, is established as the point or range above which water spray 64 is injected, and vice-versa.

In accordance with another phase of the control of the humidity and/or the temperature of the inlet process oxidant flow stream 53, 42, it may be important to assure adequate wetting of the enthalpy exchange barrier 46 at the time of power plant start-up, particularly after an extended shutdown when the barrier may be particularly dry and before the exhaust flow stream 44 can supply adequate moisture to the barrier. Accordingly, the controller 70 may be suitably programmed to recognize shutdowns of such lengthy duration and to apply a water spray 64 to the inlet process oxidant flow stream 53, 42 at start-up. The spray may be applied for a predetermined duration to assure wetting, or "wet-up", of the barrier 46, or until some sensed parameter, such as operational flow pressure drop across the ERD 32 (not shown), indicates the spray is no longer required.

As a specific sub-set of the provision above for assuring that the enthalpy exchange barrier 46 is adequately wetted during the start-up interval, there may be further instances when the power plant 10 has been in a shutdown mode during a freezing condition, and the barrier 46 and/or other elements downstream of the ERD 32 relative to the inlet process oxidant flow stream 53, 42 are frozen. Such condition is normally determined or inferred by the oxidant ambient temperature sensor 80 (or by another temperature sensor, not shown) and used to provide an input to controller 70 to not only apply spray 64, but to also energize heater 78 to heat the water in spray 64 and thereby assist in melting ice in the ERD and/or downstream thereof. The duration of the injection of the heated water spray may be either a predetermined interval, fixed or variable as a function of the temperature of the ambient air providing the process oxidant flow stream, or it may be automatically varied in response to a sensed parameter downstream thereof that indicates that the condition of icing no longer exists.

In accordance with yet another aspect, the water balance in the fuel cell power plant 10 may be adjusted by controlling the dew point in the process oxidant flow stream 42 in the ERD 32 to temporarily degrade the mass transfer performance of the ERD and thereby increase the amount of water removed from the power plant 10 via the fuel cell exhaust flow stream 44 in the ERD 32 and exhaust stream 52 issuing therefrom. This action may be taken to prevent excessive water recovery, which may in turn lead to water overflow from the system. Such water overflow is generally objectionable because of codes against ground spillage, need for plant drainage systems that include discharge fees, etc.

The degradation of water transfer by the ERD 32 is accomplished by relatively increasing the dew point of the process oxidant flow stream 42 by injecting a spray 64 of heated water into the process oxidant stream 53, 42. As the dew point is increased in the process oxidant flow stream 44 in ERD 32, it correspondingly decreases the amount of water that oxidant flow can acquire from the exhaust flow. In this way, the water balance in the power plant 10, and particularly in coolant loop 38, may be decreased somewhat by the exhaust of a relatively larger quantity of water in the exhaust flow stream 44 in response to a relatively smaller addition of warmer water to raise the dew point in the process oxidant flow stream 44. Typically, level sensor 90 associated with the accumulator 88 in the coolant loop 38 monitors a water balance parameter, such as water level, and provides an input to controller 70 which in turn controls valve 74 and heater 78 to provide a heated water spray 64 for an appropriate interval.

Although the invention has been described and illustrated with respect to the exemplary embodiments thereof, it should be understood by those skilled in the art that the foregoing and various other changes, omissions and additions may be made without departing from the spirit and scope of the invention.

What is claimed is:

1. A fuel cell power plant (10) for generating electrical energy from a process oxidant stream (53, 42, 28) and a reducing fluid stream (26), the plant comprising:
   a) at least one fuel cell (12) for producing the electrical energy from the process oxidant stream (53, 28) and the reducing fluid stream (26), and providing a fuel cell exhaust stream (48) containing moisture and sensible heat;
   b) an energy recovery device (32) having first and second gas flow channels (44, 42) separated by a respective enthalpy exchange barrier (46), the fuel cell exhaust stream (48) connected to pass through the first gas flow channel (44) and a source of process oxidant (30) for the process oxidant stream (53) connected to pass through the second gas flow channel (42), thereby to allow mass and heat transfer between the gases in the first and second gas flow channels via the enthalpy exchange barrier;
   c) a supply of liquid medium (66); and
   d) means (58, 60) for injecting the liquid medium (66, 64) substantially directly into the process oxidant stream (53) preparatory to the process oxidant passing through the energy recovery device second gas flow channel (42) for regulating the transfer of mass and heat between the fuel cell exhaust stream (48) and the process oxidant stream (53, 42).

2. The fuel cell power plant (10) of claim 1 wherein the energy recovery device includes an inlet (54) for receiving the process oxidant stream (53) to pass through the second gas flow channel (42), the liquid medium for injection is water, and the injecting means (58, 60) is positioned to inject the water into the process oxidant stream (53) immediately upstream of said inlet (54).

3. The fuel cell power plant (10) of claim 2 including a plenum (62) located immediately upstream of said inlet (54), said process oxidant stream (53) flows through said plenum (62), and wherein the injecting means (58, 60) is operative to inject water (66, 64) into the plenum (62) for intimate mixing with and humidification of the process oxidant stream.

4. The fuel cell power plant (10) of claim 3 wherein the injecting means comprises one or more spray nozzles (60) disposed to inject a spray of water (66, 64) into the plenum (62).

5. The fuel cell power plant (10) of claim 1 including control means (70, 74, 78, 80, 84) operatively associated with the injecting means (58, 60) for controlling at least the amount of the liquid medium (66, 64) being injected.

6. The fuel cell power plant (10) of claim 5 wherein the control means (70, 74, 78, 80, 84) include at least one or the other of a temperature sensor (80) for sensing the temperature of ambient process oxidant and a humidity sensor (84) for sensing the moisture content of the ambient process oxidant.

7. The fuel cell power plant (10) of claim 6 wherein the control means (70, 74, 78, 80, 84) includes both the temperature sensor (80) and the humidity sensor (84).

8. The fuel cell power plant (10) of claim 1 wherein the enthalpy exchange barrier (46) of the energy recovery device (32) comprises a fine-pore support matrix.

9. The fuel cell power plant (10) of claim 8 wherein the fine-pore support matrix is one or a combination selected from the group consisting of porous graphite layers; porous graphite-polymer layers, inorganic-fiber thermoset polymer layers, glass fiber layers, synthetic-fiber filter papers treated to be wettable, porous metal layers, and perforated metal layers with particulate material in the pores.

10. In a fuel cell power plant (10) for generating electrical energy from a process oxidant stream (53, 42, 28) and a reducing fluid stream (26), the plant comprising a fuel cell (12) for producing the electrical energy from the process oxidant stream (53, 28) and the reducing fluid stream (26), and providing a fuel cell exhaust stream (48) containing moisture and sensible heat; and an energy recovery device (32) having first and second gas flow channels (44, 42) separated by a respective enthalpy exchange barrier (46), the fuel cell exhaust stream (48) connected to pass through the first gas flow channel (44) and a source of process oxidant

(30) for the process oxidant stream (53) connected to pass through the second gas flow channel (42), thereby to allow mass and heat transfer between the gases in the first and second gas flow channels via the enthalpy exchange barrier, the method comprising: dispensing water (66, 70, 74, 60, 64) substantially directly into the process oxidant stream (53) preparatory to the process oxidant passing through the energy recovery device second gas flow channel (42) for regulating the transfer of mass and heat between the fuel cell exhaust stream (48) and the process oxidant stream (53, 42).

11. The method of claim 10 wherein the step of dispensing water (66, 70, 74, 60, 64) into the process oxidant stream (53) comprises monitoring (80, 84, 90) one or more parameters of the fuel cell power plant (10), including the process oxidant stream (53, 42, 28), and controllably injecting water into the process oxidant stream (53) in response to the one or more of the monitored parameters.

12. The method of claim 11 comprising the steps of monitoring (80) the temperature of the process oxidant stream (53), and injecting water (66, 70, 74, 60, 64) into the process oxidant stream when the temperature exceeds a threshold, thereby to cool and humidify the process oxidant stream (53, 42) to inhibit dry-out of the enthalpy exchange barrier 46 in the energy recovery device 32.

13. The method of claim 12 wherein the temperature threshold is higher than about 95° F. and lower than about 90° F.

14. The method of claim 11 wherein the operating status of the power plant (10) is monitored (70, 80) to identify a start-up condition, and injecting water (66, 70, 74, 60, 64) into the process oxidant stream upon start-up, at least after a shutdown exceeding a predetermined duration, for assuring sufficient wetting of the enthalpy exchange barrier (46) during start-up.

15. The method of claim 14 wherein a temperature of the power plant (10), including the inlet temperature of the process oxidant stream (53, 42, 28), is monitored (80) to detect a freezing condition, and controllably (70, 78) injecting heated water (66, 58, 60, 64) during start-up in response to detection of a freezing condition to defrost at least the energy recovery device 32.

16. The method of claim 11 wherein the fuel cell power plant (10) includes a coolant system (38, 88) having a coolant, the coolant having a level, and including the steps of monitoring (90) the level of coolant in the coolant system (38, 88) and injecting water (66, 58, 70, 74, 78, 60, 64) into the process oxidant stream when the coolant level exceeds a threshold, thereby to raise the dew point of the process oxidant stream (53, 42) to inhibit recovery of water from the fuel cell exhaust stream 48 via the enthalpy exchange barrier 46 to the process oxidant stream (42).

* * * * *